United States Patent [19]
Taft

[11] 3,980,519
[45] Sept. 14, 1976

[54] DAMPER MECHANISM FOR NUCLEAR REACTOR CONTROL ELEMENTS

[75] Inventor: William Elwood Taft, Los Gatos, Calif.

[73] Assignee: The United States of America as represented by the United States Energy Research and Development Administration, Washington, D.C.

[22] Filed: June 4, 1974

[21] Appl. No.: 476,183

[52] U.S. Cl. .............................................. 176/36 R
[51] Int. Cl.² ...................... G21C 7/08; G21C 7/20
[58] Field of Search .............. 176/36 R, 36 S, 36 C, 176/36 W; 188/297, 316

[56] References Cited
UNITED STATES PATENTS

| | | | |
|---|---|---|---|
| 2,838,300 | 6/1958 | Gray | 267/1 |
| 2,994,655 | 8/1961 | Taylor, Jr. | 204/193.2 |
| 3,107,209 | 10/1963 | Frisch | 204/193.2 |
| 3,152,960 | 10/1964 | Alfred | 176/36 |
| 3,750,389 | 8/1973 | Breed | 58/144 |

FOREIGN PATENTS OR APPLICATIONS 886,317 1/1962 United Kingdom............ 176/365 X Primary Examiner—Samuel W. Engle
Assistant Examiner—Ralph Palo
Attorney, Agent, or Firm—Dean E. Carlson; James M. Hanley; L. E. Carnahan

[57] ABSTRACT

A damper mechanism which provides a nuclear reactor control element decelerating function at the end of the scram stroke. The total damping function is produced by the combination of two assemblies, which operate in sequence. First, a tapered dashram assembly decelerates the control element to a lower velocity, after which a spring hydraulic damper assembly takes over to complete the final damping.

3 Claims, 2 Drawing Figures und 3,980,519

DAMPER MECHANISM FOR NUCLEAR REACTOR CONTROL ELEMENTS

BACKGROUND OF THE INVENTION

The invention described herein was made in the course of, or under Contract No. AT(04-3)-893, Task 7, with the United States Atomic Energy Commission.

This invention relates to control systems for nuclear reactors, particularly to shutdown systems for nuclear reactors which holds control rods withdrawn from the reactor core until a scram signal is received whereupon the control rods are released to enter the core, and more particularly to a combination dashram-damper mechanism for decelerating the control element after it enters the reactor core.

In many types of nuclear reactors it is known that in order to control the output and uniform fuel consumption of the reactors, to insert control rods bearing a neutron absorbing material thereon into the reactor core. Such control rods are driven in their normal mode of operation in such a manner that it is possible to perform thereon a fine adjustment. However, it is not possible, in the case of an emergency, for example, to drive the control rods using the normal control drives so that they enter into the reactor core sufficiently rapidly.

As known in the art, nuclear reactors require reliable and fast operating systems for inserting a control rod into the reactor core under certain conditions. This requirement is of particular importance for liquid metal-cooled fast breeder reactors (LMFBR). Various prior art efforts have been directed to a variety of methods and apparatus to provide the necessary emergency or scram control for such reactors, as exemplified by U.S. Pat. No. 3,535,206, issued Oct. 20, 1970 to J. H. Germer, and U.S. Pat. No. 3,728,219, issued Apr. 17, 1973 to J. Mattern et al. While these prior systems provide effective scram control and while spring hydraulic damping systems have been utilized there is a need in the prior art for mechanism capable of providing a decelerating function at the end of the scram stroke of the control rod without creating large deceleration g forces.

SUMMARY OF THE INVENTION

This invention provides a control element decelerating function (damper) at the end of the scram stroke of a backup or emergency shutdown control system. The neutron absorbing control element is slowed down at the end of its scram stroke by two assemblies. The first is a unique arrangement of a tapered dashram to dashpot device. The second is a series of spring separated discs that become flattened under the final load. Thus, the damping stroke can be accomplished without creating large deceleration g forces.

Therefore, it is an object of this invention to provide a damper mechanism for nuclear reactor control rods.

A further object of the invention is to provide control element decelerating mechanism functioning at the end of the scram stroke.

Another object of the invention is to provide a combination dashram-damper mechanism which provides a nuclear reactor control element decelerating function.

Another object of the invention is to provide a combination mechanism wherein a tapered dashram assembly decelerates the control element to a lower velocity, after which a spring hydraulic damper takes over to complete the final damping.

Other objects of the invention will become readily apparent from the following description and accompanying drawings.

DESCRIPTION OF THE INVENTION

Broadly, the invention is directed to a mechanism whereby the neutron absorbing control element of a nuclear reactor is slowed down at the end of its scram stroke, thereby functioning as a damper or decelerator. The total damping function is provided to the combination of two assemblies. The first is a tapered dashram to dashpot arrangement which decelerates the control element to a lower velocity. The second is a spring hydraulic damper incorporating a series of spring separated discs that become flattened under the final load to complete the final damping. The combination of both damping functions uses the good qualities of each to offset the other's limitations, resulting in a feasible total damping system.

Figure 1:
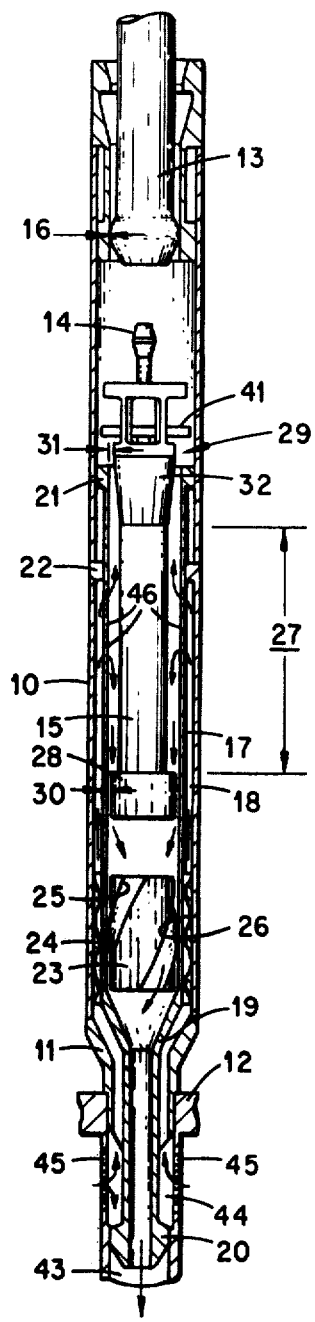
FIG. 1 is a view, partially in cross-section, of a low section of a control assembly incorporating the invention.

Referring now to FIG. 1, the lower section of a control assembly illustrated therein which incorporates the invention comprises an outer casing 10 having a reduced diameter lower end portion 11 which extends into a reactor core support structure 12. Mounted in the upper end of casing 10 is a latch mechanism 13 for retaining and releasing a coupling head 14 of a control element 15. The details of the latch mechanism 13 do not constitute part of this invention, but by way of example may be of the type described and claimed in copending U.S. patent application Ser. No. 476,184 filed June 4, 1974 in the name of M. L. Johnson et al entitled, Quick Release Latch For Reactor Scram, and assigned to the same assignee. The latch mechanism 13 is constructed to define a latch annulus 16 for purposes described hereinafter. Mounted within casing 10 and in spaced axial relation with respect to latch mechanism 13 is a guide tube 17 which forms with casing 10 an annulus or space 18 through which coolant flows as discussed below. A lower end portion 19 of guide tube 17 is formed of a smaller diameter and of greater wall thickness and is provided at the end with a radially protruding section 20 which cooperates with core support structure 12 to prevent coolant flow between high and low pressure coolant as described hereinafter. Guide tube 17 is provided at the upper end with a radially outward protruding flange-like member defining a down stop 21 and is secured to outer casing 10. Outer casing 10 is provided with an inwardly protruding portion 22 which abuts against guide tube 17 and forms a support therefore while serving as a coolant flow blockage member. Neutron shielding material indicated at 23 and 24 is positioned within guide tube 17 and annulus 18, respectively, and adjacent reduced diameter lower end portion 19 of guide tube 17. Helical grooves or passages 25 and 26 are forming in shielding material 23 and 24, respectively, to provide a coolant flow path therethrough. Control element 15 is movably located within guide tube 17 and is constructed of a central control rod region 27 containing neutron absorbing material, a piston 28 at the lower end, and a damper mechanism generally indicated at 29, shown in detail in FIG. 2, at the upper end which is attached to coupling head 14. Piston 28 is of a larger diameter than control rod region 27 and defines with guide tube 17 a piston annulus 30, while damper mechanism 29 defines with guide tube 17 a damper annulus 31, the function of each annulus to being described below.

Figure 2:
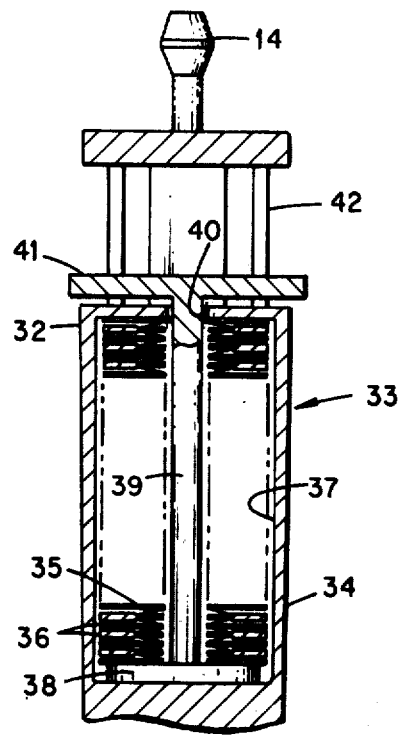
FIG. 2 is an enlarged partial cross-sectional view of the FIG. 1 embodiment of the invention.

FIG. 2 is an enlarged illustration of the damper mechanism 29 and comprises generally a dashram assembly 32 and a spring hydraulic damper assembly 33. Dashram assembly 32 is located about the lower section of damper assembly 33 and, as seen in FIGS. 1 and 2, includes a tapered surface 34 which cooperates with down stop 21 to form a dashram to dashpot effect described below. Damper assembly 33 is composed of a series of interconnected springs 35 and discs or plates 36 positioned in a chamber 37 formed within dashram assembly 32, a support plate 38 positioned below the spring-discs 35-36 and which is connected to a rod or shaft 39 extending upwardly through the spring-discs and through an aperture or opening 40 in dashram assembly 32 and connected to a spider 41 movably positioned within a support structure 42 connected to coupling head 14.

During normal operation of the reactor the control element 15 is maintained in a raised position by coupling head 14 being retained in an activated latch mechanism 13 whereby the control rod region 27 is removed from the reactor core. Upon an emergency or scram condition the latch mechanism 13 is deactivated releasing the coupling head 14 and the control element 15 is inserted into the reactor core by gravitational force and by hydraulic pressure acting on the control element as described hereinafter.

During scram conditions and prior to the damping action provided by this invention, the control element 15 is accelerated downward within the guide tube 17 by gravity and pressure forces across the control element piston 28. The piston's lower surface is exposed to pressure vented as indicated by arrows to a reactor low pressure plenum, indicated at 43, via grooves 25 in shielding material 23 and the reduced diameter portion 19 of guide tube 17; while the region above the piston 28 contains pressure ducted to a reactor high pressure plenum indicated at 44. The coolant from high pressure plenum 44 passes, as indicated by arrows, through apertures or openings 45 in core support structure 12, upwardly along annulus 18, through helical grooves 26 in shielding material 24, and through openings or apertures 46 in guide tube 17 located adjacent the control rod region 27 below protruding member or portion 22 of outer casing 10, into guide tube 17 and about control element 15 applying high pressure on the upper surface of piston 28. With latch mechanism 13 being located so as to create latch annulus 16 a flow restriction is formed that leaks enough therethrough to allow normal coolant flow, but which is restrictive enough to maintain a high pressure within the guide tube 17 due to the larger size of the flow channel from the high pressure plenum into the guide tube.

During the downward scram stroke of the control element 15, coolant or fluid must flow into the casing 10 volume between latch mechanism 13 and the control element to backfill the swept volume within the guide tube 17 by the moving control element. Before the tapered dashram assembly 32 enters the inside diameter of the down stop 21, a generous flow area is provided through the control rod region 27 to supply the backfill flow. However, when the tapered dashram assembly 32 enters the down stop 21 inside diameter, the backfill flow is progressively reduced by the tapered surface of the dashram assembly. This reduction of the backfill flow will reduce the pressure in the region above the down stop 21, and thus decelerate the control element 15.

Because of the flow past latch annulus 16 and minimum practical annular clearances for the dashram assembly 32, the dashram will not decelerate the control element to a low enough final velocity. After the dashram assembly 32 decelerates the control element 15 to a lower velocity, the spring hydraulic damper assembly 33 takes over to complete the final damping. As seen in FIG. 2, the closely spaced discs or plates 36 are lightly spring loaded apart and the chamber 37 is filled via opening 40 with fluid or coolant. As the control element 15 moves downwardly, spider 41 contacts the down stop 21 causing the support plate 38 to cease downward movement whereby the discs 36 are forced together, surface to surface, and expel the fluid originally therebetween creating a damping action such that the downward movement of control element 15 is stopped prior to its contact with shielding material 23. Support structure 42 is constructed so as to allow continued downward movement of control element 15 after spider 41 contacts down stop 21, as seen from the drawings. The springs 35 have a soft enough deflection characteristic to result in the stack of discs 36 to be fully compressed from the weight of the control element 15, thus preventing spring back and resulting in the control rod region 27 being evenly located top and bottom within the reactor core region of the surrounding fuel assemblies.

The advantages of the dashram assembly 32 working in combination with the spring hydraulic damper assembly 33 of the damper mechanism 29 is that the dashram portion of the damping stroke functions to reduce the initial high velocities of the control element to a level acceptable to the spring hydraulic damper portion of the stroke. Analysis of the spring hydraulic damper assembly indicates that large deceleration g forces will result if a spring hydraulic damper alone damps the initial velocities of control elements for the LMFBR. The combination of both damping functions uses the good qualities of each to offset the other's limitations, resulting in a feasible total damping system.

While a particular embodiment of the invention has been illustrated and described, modifications will become apparent to those skilled in the art, and it is intended to cover in the appended claims all such modifications as come within the spirit and scope of the invention.

What I claim is:

1. In a control assembly for a nuclear reactor having a guide tube mounted within an outer casing forming an annulus therebetween and having a control element normally retained for insertion under scram conditions into the reactor core through the guide tube having fluid therein, the improvement comprising: a damper mechanism secured to said control element and composed of a dashram assembly working in sequence with a spring hydraulic damper assembly; said spring hydraulic damper assembly being located within said dashram assembly; said dashram assembly including a tapered outer surface which cooperates with a portion of said guide tube causing a dashpot effect and decelerating movement of said control element; said spring hydraulic damper assembly including a member contacting said portion of said guide tube thereby activating said damper assembly causing final damping of control element movement said dashram assembly comprising an annular housing having said tapered outer surface thereon and defining a chamber therein, said portion of said guide tube defining a down stop member having an internal annular diameter larger than said tapered outer surface of said housing to define a decreasing cross-sectional annulus therebetween as said housing passes through said down stop member, said spring hydraulic damper assembly comprising a series of spring load discs positioned within said chamber of said dashram assembly housing, said housing being closed at opposite ends except for a centrally located opening in one end, a support plate positioned intermediate one end of said chamber and said discs, a rod means connected to said support plate and extending through said series of discs and outwardly through said opening in said housing, and a spider member secured to said rod means, said spider member being of a cross-section greater than said housing and said internal annular diameter of said down stop member, said chamber being adapted to contain a fluid, whereby downward movement of said damper mechanism causes said spider member to contact said down stop member causing said discs to be forced together by movement of said housing with respect to said piston expelling fluid from between said discs causing a damping action.

2. The control assembly improvement defined in claim 1, wherein said dashram assembly housing is secured to a coupling head of said control element through a support structure configured to accommodate movement therein of said spider member of said spring hydraulic damper assembly.

3. The control assembly improvement defined in claim 1, wherein said series of spring load discs is composed of a plurality of discs having springs interposed between each pair of adjacent discs.

* * * * *